Figure 1:
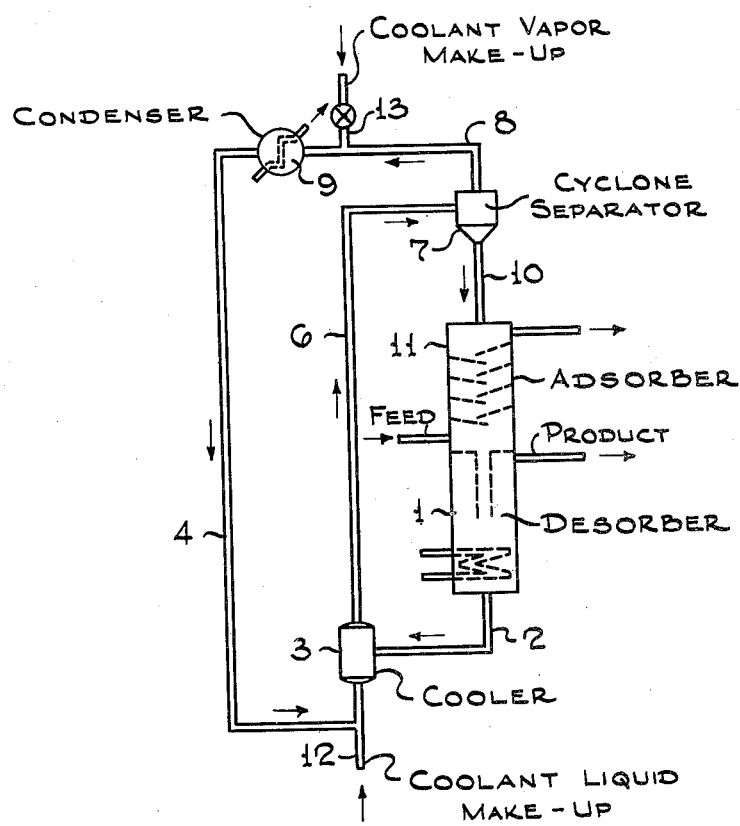

April 8, 1952     J. P. MORGAN ET AL     2,592,453
TEMPERATURE CONTROL OF ADSORPTION SYSTEMS Jerome P. Morgan
John A. Patterson   Inventors By Henry Berk Attorney Patented Apr. 8, 1952

2,592,453

UNITED STATES PATENT OFFICE 2,592,453

TEMPERATURE CONTROL OF ADSORPTION SYSTEMS

Jerome P. Morgan, Maplewood, and John A. Patterson, Beverly, N. J., assignors to Standard Oil Development Company, a corporation of Delaware Application March 6, 1948, Serial No. 13,413

1 Claim. (Cl. 260—666)

This invention relates to improvements in methods for closely controlling temperatures in adsorption-desorption and absorption-desorption systems where the sorption medium is a solid, and particularly where the solid is moved through the adsorption or absorption and desorption stages either as a mass flowing by gravity or as a fluidized solid.

In an adsorption and desorption operation where the solid adsorbent is introduced into one part of an adsorber and travels through at least a part of the adsorber to selectively adsorb at least one class of compounds, and is then separated from the feed mixture and heated for recovery of the adsorbate, cooling of the hot powdered regenerated solid presents practical difficulties. Similar problems arise in absorption-desorption systems, e. g., where complex-forming solid absorbents are used to effect the desired separation and are subsequently regenerated by heat (or other means). This process is applicable to both systems.

According to this invention these difficulties are overcome by contacting, with an inert liquid coolant, the hot desorbed solid. The desorbed solid is then cooled by the heat absorbed in vaporizing the liquid coolant. In cooling the solid the heat should be absorbed almost entirely as latent heat; this will regulate the quantity of coolant required so as to avoid having to remove sensible heat from coolant which would require more heat exchange surface. The inert coolant is selected so that at the temperature of the cooling system the boiling point is within reasonable limits of the desired final adsorbent temperature. The coolant need not be entirely inert so long as the affinity of the adsorbent for it is less than for the materials involved in the separation. Adsorption temperature should be sufficiently high so that cooling water can be used to condense the coolant (otherwise a refrigerant would be required). By this method, the temperature of the adsorbent is closely controlled under conditions where a high heat transfer coefficient is obtained while avoiding the necessity of bringing the solid adsorbent in contact with a heat exchange surface. A close temperature approach in such a system avoids the thermal losses inherent in indirect heat exchange. Furthermore, heat removal from the cooling agent is accomplished by condensation, an operation which is favorable to high heat transfer rates.

This system may be applied to various types of adsorption-desorption and absorption-desorption operations. In the preferred system it is applied to a fluidized solid system where the cooling medium after vaporization acts as the fluidizing agent for circulating the solid adsorbent. It may also be applied where a mechanical conveyor system is used to return desorbed solid to the adsorber for reuse.

In a fluidized solid system, the operation comprises a finely divided material where for example, powder silica gel, alumina gel, activated charcoal, activated carbon or other solid adsorbent is fluidized by blowing a gas through it. The fluidized finely divided material behaves like a liquid and has many of the hydraulic properties of a liquid in that:

1. It flows through pipes under the influence of an unbalanced force such as gravity, differential pressures, etc.
2. It tends to assume the shape of the container.
3. It flows through conduits, or pipes accompanied by a pressure drop.
4. Gas seals can be produced in the same manner as a liquid is used to seal a gas holder.

The liquid coolant which may be propane, butane, pentane or hexane and their isomers, common refrigerants such as methyl chloride, ethyl chloride and also volatile solvent alcohols, ethyl or isopropyl, or a halogenated compound, is intimately mixed with the hot stripped adsorbent in a pipe of suitable size or in a chamber similar to a fluidized solid reactor. The coolant is vaporized and an intimate mixture of cool adsorbent plus coolant vapor is obtained while the solid is in a fluidized condition. By fixing the rate of withdrawal of this fluidized mixture, the latter may be elevated to a separator above the adsorber without classification. It is possible to maintain a leg of liquid coolant such that continuous flow will result, alternately a pump may be used to supply the head required. After separation of coolant and the cooled adsorbent in a cyclone separator or similar device, the coolant is then condensed and returned to the liquid leg or storage for reuse. Small amounts of coolant may be retained by the adsorbent and perhaps desorbed with the product or products necessitating an equivalent make-up which may be introduced into the coolant system at an appropriate place.

Since it is frequently desirable to operate the adsorption and the desorption steps at higher pressure than that used in coolant chamber, the cooled stripped adsorbent from the cyclone separator can be introduced into the adsorber through a stand-pipe of suitable height. This standpipe further acts as a seal between the coolant and the adsorption systems. The higher pressure of the adsorption-desorption systems is desirable in forcing the hot stripped adsorbent to flow from the desorber into the coolant system.

Under special conditions use of external coolant is not necessary, for example when adsorption is carried out under conditions such that the unadsorbed material leaves the adsorber at a temperature within its boiling range this material may act as the coolant. This novel cooling arrangement enjoys all of the advantages obtained with an external coolant, namely: (1) close control of the adsorbent temperature under conditions where a high heat transfer coefficient is obtained while avoiding the necessity of bringing the solid adsorbent in contact with a heat exchange surface; (2) close temperature approach is possible thereby avoiding high thermal losses inherent in indirect heat exchange; and (3) heat removal from the cooling agent (adsorber overhead) is accomplished by condensation, an operation which is favorable to high heat transfer rates. The latter system enjoys the additional advantages resulting from the elimination of an external inert coolant, namely: (1) lower investment and operating costs are possible since handling of an additional material is not necessary, and (2) product contamination is avoided.

Either system can be applied to various types of adsorption-desorption operations. In the preferred application the novel cooling systems are applied to a fluidized solid operation where the external coolant or the adsorber overhead, after cooling the solid adsorbent by vaporization, acts as a fluidizing agent for the latter. It may also be applied where a mechanical conveyor system is used to recycle the solid adsorbent.

In one liquid phase adsorption system, the adsorber overhead is intimately mixed with hot stripped adsorbent in a pipe of suitable size or in a chamber similar to fluidized solid reactor. The liquid coolant (adsorber overhead) is vaporized and an intimate mixture of cooled adsorbent plus coolant vapor is obtained so that the solid is in a fluidized condition. After separating the solid adsorbent from the vaporized adsorber overhead in a cyclone separator or similar device, the vapor is removed as product for subsequent treatment as desired. It may be that only a portion of the coolant in the adsorber overhead is required for cooling. In such a case the remainder may be vaporized and added to the product vapor leaving the cyclone, or, if desired, taken off directly as liquid product.

This method of controlling temperatures is also applicable to absorption processes, for example, in a continuous absorption-stripping operation a solid absorbent is introduced into an absorber, and is allowed to remain in contact with the feed material for a limited time. Here the solid selectively absorbs one type of compound. The absorbent after being withdrawn from contact with the feed mixture is desorbed for recovery of the absorbate and regeneration of the solid absorbent. The stripped absorbent which is then at an elevated temperature is cooled prior to its return to the absorber by contacting with a liquid coolant. The heat of the absorbent is absorbed in vaporizing the liquid coolant.

Figure 2:
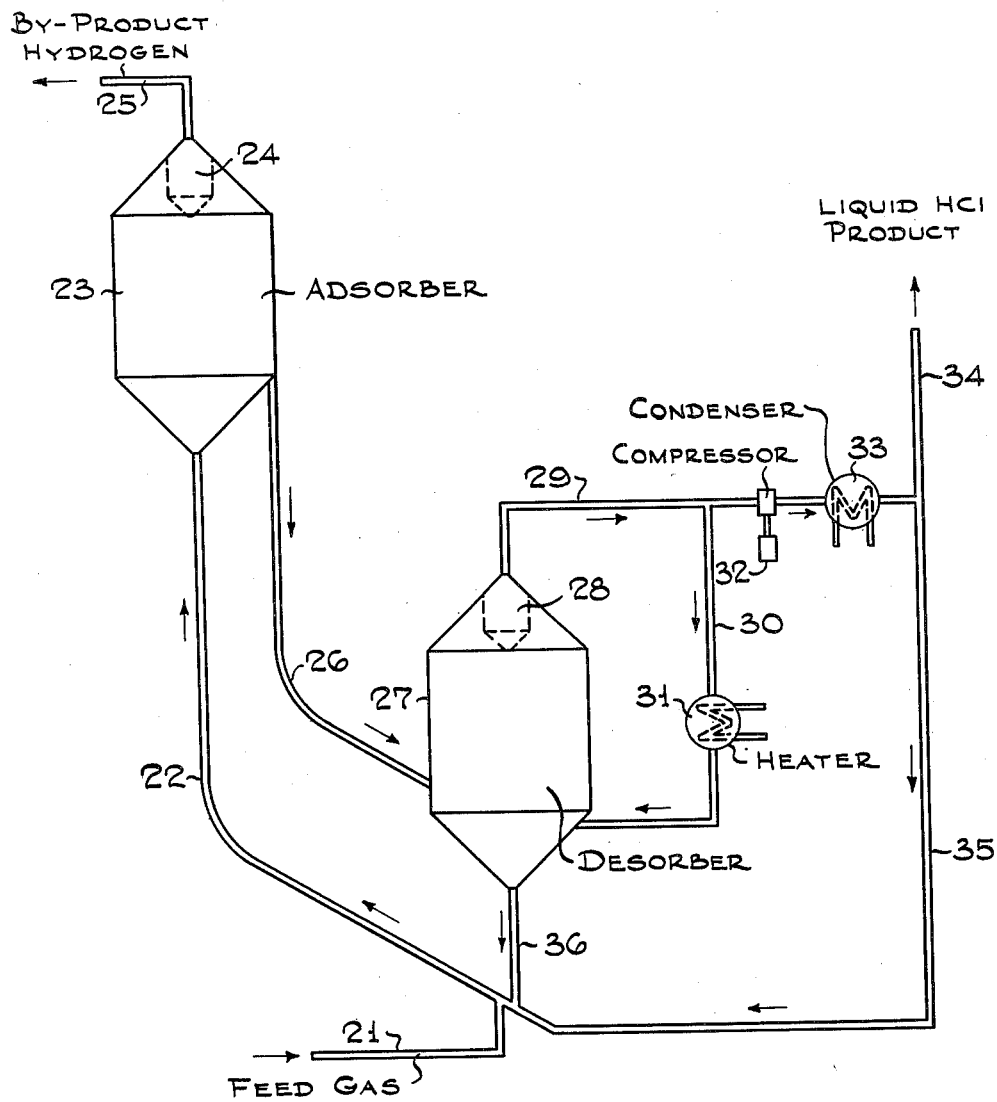

This system can be applied to various types of sorption operations and will be more clearly understood by reading the following description with reference to the following drawing in which;

Fig. 1 showing the flow plan of one cooling and fluidizing system,

Fig. 2 showing the flow plan of an internal cooling system using an adsorbent in which chemisorption is involved.

Figure 3:
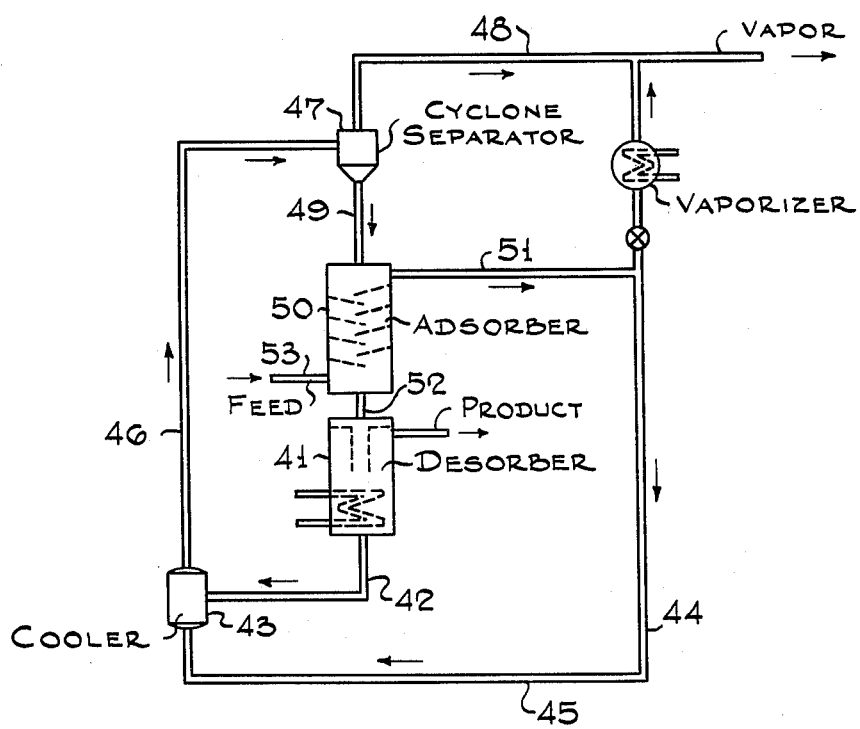
Figure 4:
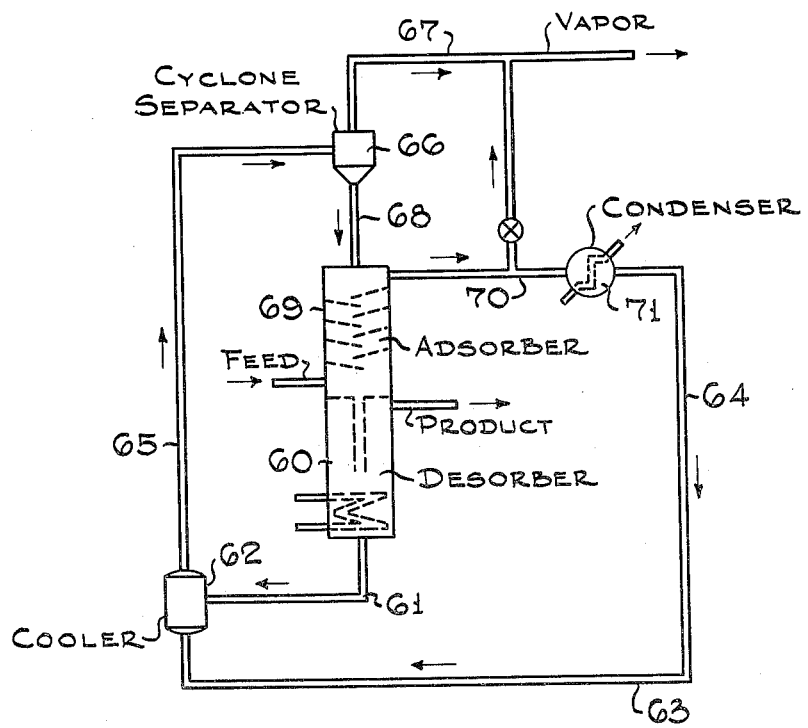

Fig. 3 showing the flow plan of a cooling system for liquid phase adsorption and Fig. 4 showing the flow plan of a cooling system for vapor phase adsorption operation.

Referring to Fig. 1, powdered hot activated charcoal or carbon is heated in desorber 1, to desorb an adsorbate such as cyclohexane at a temperature of 300 to 550° F. Heat not only removes the adsorbate, but also regenerates the solid. The solid is passed through a pipe 2, to a cooling chamber 3, supplied with a liquid coolant, for example normal pentane, from a liquid leg in pipe 4. In cooling chamber 3, the liquid coolant is vaporized and serves as a lift to pass the adsorbent up through pipe 6, to a cyclone separator 7, where the n-pentane vapor is removed through pipe 8 to condenser 9, thence as condensate to liquid coolant leg 4. A pipe can be used in place of cooling chamber 3. The separated adsorbent is then passed through standpipe 10, to an adsorber 11, where it is again contacted with a liquid, or vapor to adsorb the desired product. Coolant liquid makeup may be added through pipe 12, to cooler 3, and coolant vapor makeup may be added through pipe 13, to pipe 8. The vaporization temperature of the coolant determines the temperature of the adsorbent passed to adsorber 11. Sufficient coolant should be used to avoid superheating coolant vapor. Normal pentane may be condensed by using water in condenser 9. Cyclohexane will displace n-pentane from adsorbent and an adsorption temperature of about 100° F. is used.

An example of an application to a vapor-phase chemisorption-desorption system in which no external coolant is used, Fig. 2 is used to illustrate. Anhydrous hydrogen chloride with hydrogen is passed through pipe 21, into pipe 22, through which is passed fluidized powdered lead chloride into adsorber 23. Adsorber 23 is provided with a cyclone separator 24, and the unadsorbed hydrogen is removed through pipe 25. The fluidized solid with the adsorbed hydrogen chloride in the complex form of $PbCl_2 \cdot 2HCl$ is passed through pipe 26, into desorber 27, provided with a cyclone separator 28, from which is removed through pipe 29 the HCl vapor product. Part of the HCl vapor thus removed is recycled through pipe 30, through heater 31, and thence to the bottom of desorber 27, to provide the heat for obtaining the desired desorption temperature. The remainder of the product is passed through compressor 32, to condenser 33, and may be removed from the system by means of pipe 34, a fraction is returned by pipe 35, to pipe 22 where it serves as a liquid coolant and as the fluidizing agent. The latent heat adsorbed in vaporizing the liquid HCl cools the hot desorbed solid to the desired level. The hot desorbed solid is removed from the desorber 27, by means of pipe 36, and passed into pipe 22. An external liquid coolant such as n-pentane may be used without a compressor when a liquid HCl product is not desired.

*Example of application to liquid-phase adsorption-desorption in which no external coolant is used*

Referring to Fig. 3, where n-butane which vaporizes at 100° F. and 55 pounds per square inch pressure is separated from a mixture of higher hydrocarbons by adsorption on a solid adsorbent and desorbed in desorber 41 by means of heat, the solid desorbed adsorbent leaves desorber 41, by means of pipe 42, and is passed into a chamber 43, where it comes in contact with a liquid normal butane product maintained in leg 44 and passed by means of pipe 45 to chamber 43. The liquid product is vaporized and serves as a lift to carry the adsorbent through pipe 46 to a cyclone separator 47. The product is removed through pipe 48 and the adsorbent passed through pipe 49 to a separate absorber 50, part of the product being passed through pipe 51 to the liquid leg 44. The feed being introduced through pipe 53 and the adsorbent with the adsorbed hydrocarbon is passed through pipe 52 to desorber 41.

*Example of application to vapor-phase adsorption-desorption with no external coolant*

Referring to Fig. 4, where n-hexane boiling at 155° F. is separated from a mixture of n-hexane, cyclohexane and benzene, the hot adsorbent after separating cyclohexane and benzene is passed from desorber 60 through pipe 61 to cooling chamber 62, where it is cooled by a liquid n-hexane supplied by pipe 63 from liquid leg 64. The liquid n-hexane on cooling the adsorbent and vaporization serves as a lift or fluidizer to pass the adsorbent upwardly through pipe 65 to cyclone separator 66 where a vapor of n-hexane is removed through pipe 67, and the cooled adsorbent is passed through pipe 68 to adsorber 69. The unadsorbed n-hexane vapor is removed from adsorber 69, by means of pipe 70 is passed through condenser 71, to the liquid leg 64.

What is claimed is:

In a process for separating cyclohexane from normal hexane in a countercurrent adsorption-desorption process, utilizing downwardly flowing fluidized silica gel in an adsorption zone and wherein hot desorbed silica gel is obtained at a temperature above that required for adsorption, the improvement which comprises the steps of contacting the hot silica gel with a sufficient quantity of liquid hexane to lower the temperature of the adsorbent to the desired adsorption temperature, thereby vaporizing the hexane; utilizing the hexane vapors to transport the cooled fluidized silica gel suspended in said hexane vapors to an upper portion of the adsorption zone; separating the cooled fluidized silica gel from the hexane vapors; condensing the hexane vapors and utilizing this hexane condensate to contact additional quantities of hot desorbed silica gel.

JEROME P. MORGAN.
JOHN A. PATTERSON.

REFERENCES CITED

The following references are of record in the file of this patent:

UNITED STATES PATENTS

| Number | Name | Date |
|---|---|---|
| 1,685,883 | Ray | Oct. 2, 1928 |
| 1,825,707 | Wagner, Jr. | Oct. 6, 1931 |
| 1,849,648 | Urbain | Mar. 15, 1932 |
| 2,384,311 | Kearby | Sept. 4, 1945 |
| 2,398,101 | Lipkin | Apr. 9, 1946 |
| 2,398,759 | Angell | Apr. 23, 1946 |
| 2,470,339 | Claussen et al. | May 17, 1949 |